Sept. 20, 1960 W. E. WALTERS 2,953,384

AUTOMATIC SELECTION OF SOUND TRACKS IN A DRUM REPRODUCER

Filed April 2, 1956 6 Sheets-Sheet 1

WILBUR E. WALTERS,
INVENTOR.

BY A. M. Shapiro
His attorney

Sept. 20, 1960 W. E. WALTERS 2,953,384

AUTOMATIC SELECTION OF SOUND TRACKS IN A DRUM REPRODUCER

Filed April 2, 1956 6 Sheets-Sheet 2

WILBUR E. WALTERS,
INVENTOR.

BY A.M. Shapiro
His attorney

Sept. 20, 1960 W. E. WALTERS 2,953,384

AUTOMATIC SELECTION OF SOUND TRACKS IN A DRUM REPRODUCER

Filed April 2, 1956 6 Sheets-Sheet 3

WILBUR E. WALTERS,
INVENTOR.

BY A. M. Shapiro
His attorney

WILBUR E. WALTERS,
INVENTOR.
BY A. M. Shapiro
His attorney

AUTOMATIC SELECTION OF SOUND TRACKS IN A DRUM REPRODUCER

Filed April 2, 1956 6 Sheets-Sheet 5

WILBUR E. WALTERS,
INVENTOR.

BY A. M. Shapiro
His attorney

Sept. 20, 1960 W. E. WALTERS 2,953,384

AUTOMATIC SELECTION OF SOUND TRACKS IN A DRUM REPRODUCER

Filed April 2, 1956 6 Sheets-Sheet 6

WILBUR E. WALTERS
INVENTOR.

BY A. M. Shapiro
His attorney

United States Patent Office 2,953,384

Patented Sept. 20, 1960

2,953,384

AUTOMATIC SELECTION OF SOUND TRACKS IN A DRUM REPRODUCER

Wilbur E. Walters, Yucaipa, Calif., assignor to Joseph J. Muscolino, Sierra Madre, Calif.

Filed Apr. 2, 1956, Ser. No. 575,384

20 Claims. (Cl. 274—17)

The present invention relates generally to the sound reproduction art and, more particularly, pertains to a novel apparatus for recording a plurality of different sound tracks on a compact recording medium disposed on a drum-type transport and further adapted for selectively reproducing any one or sequential series of individual sound tracks by completely automatic control means initiated from any one of a number of separate and remote locations.

Reference is made to my earlier co-pending application entitled, "Apparatus for Reproducing Any Selected One of a Plurality of Recorded Passages Sequentially Prerecorded on a Continuous Recording Medium," Serial No. 462,734, filed October 18, 1954 (of which this is a continuation-in-part) which sets forth in detail one embodiment of the invention employing a spirally grooved recording medium having a plurality of passages recorded thereon, and providing pick-up head positioning means and selective control devices by which any one of the sequentially recorded passages could be reproduced without playing the passages preceding or following the particular passage selected.

It was also set forth in the earlier application that the scope of the invention was believed to encompass a plurality of variations in the operation of the pick-up positioning means relative to the recording medium, and the application furthermore specifically suggested an embodiment incorporating a magnetic recording medium and a drum type transport with suitable pick-up positioning means and controls therefor which, as has been indicated, is the subject and substance of the present application.

Functionally, the presently available equipment for reproducing magnetically recorded material is as limited in operational scope as that for spirally grooved recordings, and, at least insofar as is known to this inventor, heretofore no automatic apparatus has been available nor even anticipated by prior inventive art, capable of selecting and reproducing a single section or passage out of a series of sequentially recorded passages.

In the past, operations of this nature have been carried out by one or more skilled operators using devious methods of cueing the exact starting point in the length of the recording medium and bringing it into and out of the level of audibility by manual means at the proper times; but there has never been an apparatus, completely automatic and remotely initiated, capable of finding the starting point of any one of a series of recorded passages, reproducing the passage and returning the mechanism to a neutral armed position awaiting another operational command.

It was with the foregoing considerations in mind that the present invention has been made, and it can be said to have a number of important objectives.

One important object of the present invention is the provision of a system for the reproduction of any one of a plurality of sound tracks prerecorded on a multiple recording medium.

Another important object of this invention is the provision of a means for positioning a magnetic pick-up head in reproduction relationship with a multiple recording medium at any selected one of a series of precisely predetermined sound track contact points, and automatically terminating the reproduction contact relationship upon the termination of the recorded sound track.

A further important object of this invention is the provision of extremely accurate apparatus of the character described which is adapted for recording as well as reproducing individual sound tracks in accordance with remotely initiated single or sequential selections and commands.

A still further object of this invention is the provision of a system of recording and reproducing sound tracks adapted to utilize a circular band of magnetically responsive recording material having a plurality of sound tracks juxtaposed circumferentially thereon.

An additional object of my invention is the provision of a system and recording medium of the character described in which the recording medium is adapted for use with a drum type of transport dimensioned circumferentially so that a sound track of suitable predetermined duration may be recorded thereon or reproduced therefrom during a single revolution of the drum.

In brief, the selective sound track recorder-reproducer of my invention includes a supporting structure having a generally horizontal mounting surface, a generally cylindrical drum having an axial shaft interfitting with supporting journal members and provided with a variable speed motor and friction drive mechanism adapted to minimize starting lag and stopping overtravel. The drum has a smooth peripheral surface broken only by an axially aligned slot through which the ends of a wide band of magnetically responsive material, having the same properties and characteristics as conventional magnetic recording tape, is positioned by clamping means disposed along each of the edges of the slot in much the same manner as that in which a mimeograph stencil is secured to its rotatable inking cylinder. A plurality of magnetically recorded sound tracks are juxtaposed circumferentially around the surface of the magnetically responsive material, and the subject matter in each track is timed and adapted in length for completion during one revolution of the cylinder. A magnetic head, adapted for pick-up or recording, is slidably mounted for rectilinear movement along the width of the band adjacent the slot therein and movable into contact with any of the individual sound tracks thereon.

A track selector mechanism is provided by means of which any single track or sequential series of tracks may be prerecorded or reproduced. It includes a plurality of vertically disposed magnetically movable thrust bars having positioning pins extended horizontally therefrom and entered into bores in a circular collar, the pins and their respective bores being radially disposed in coplanar alignment concentric relative to the collar.

A selector arm mounted on a drive shaft disposed concentrically of the collar, is adapted for diametric rotation within the collar, one end of the arm moving adjacent the inner surface of the collar and being engageable with the point of any positioning pin which may be moved through the bore in the collar by energization of its respective electro magnet. A connecting rod member, pivotally connected to the end of the selector arm spaced from the pin contacting end, is pivotally connected at its opposite end to the carriage means which moves the magnetic head along the width of the recording medium.

Other important objects of my invention will be apparent to persons skilled in the art upon reading the following detailed description together with references to the accompanying drawings in which.

A quicker understanding of the details of my invention will be obtained through a preliminary explanation of the schematic arrangement of one complete sound recording and selective reproduction system showing the elements of invention in the environment of a typical embodiment.

Figure 5:
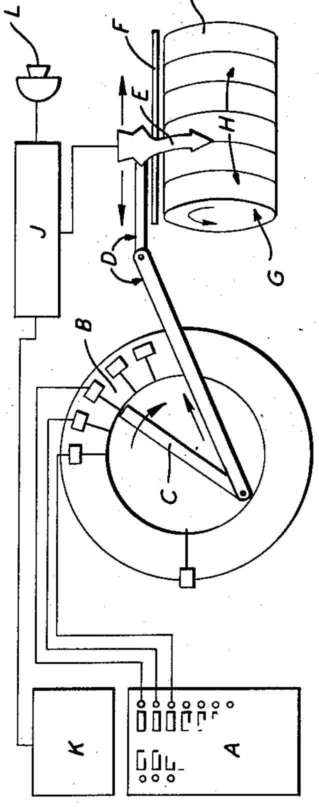
Figure 5 is a purely schematic block diagram, the only purpose of which is to show the relationship of the various components involved in one typical system incorporating the elements of my invention.

For this purpose, reference is first made to the block diagram of Figure 5 which shows schematically the operative relationship of the components employed in one typical system which has been actually reduced to practice in physical form and has been operated under service conditions for purposes of test and observation.

In Figure 5 the units shown are symbolic only and have no further referential significance. The letter A designates a switchboard assembly including a plurality of momentary contact normally open switches such as push buttons. These switches initiate the operation of a plurality of magnetically movable positioning pins disposed in a circle designated by the letter B. A selector arm C rotates diametrically within the circle B into engagement with the pins and, by means of the linkage members D is effective to move a magnetic recording and reproducing head E along the track F positioned parallel to the drum G and into rotative alignment with any of the sound tracks H on a band of recording medium I. The sound picked up by the head E then passes through the amplifier J to the speaker K, or by means of suitable switching arrangements the head E is adapted to record material originating at the microphone L.

As has been previously mentioned, the mechanical embodiment covered in the present application is one of several possible forms considered to be within the scope of the invention as first disclosed in the earlier application copending herewith, and the substantial differences in the means employed in the two embodiments is indicative of the amenability of the broad invention to further adaptation and mechanical variation.

Figure 1:
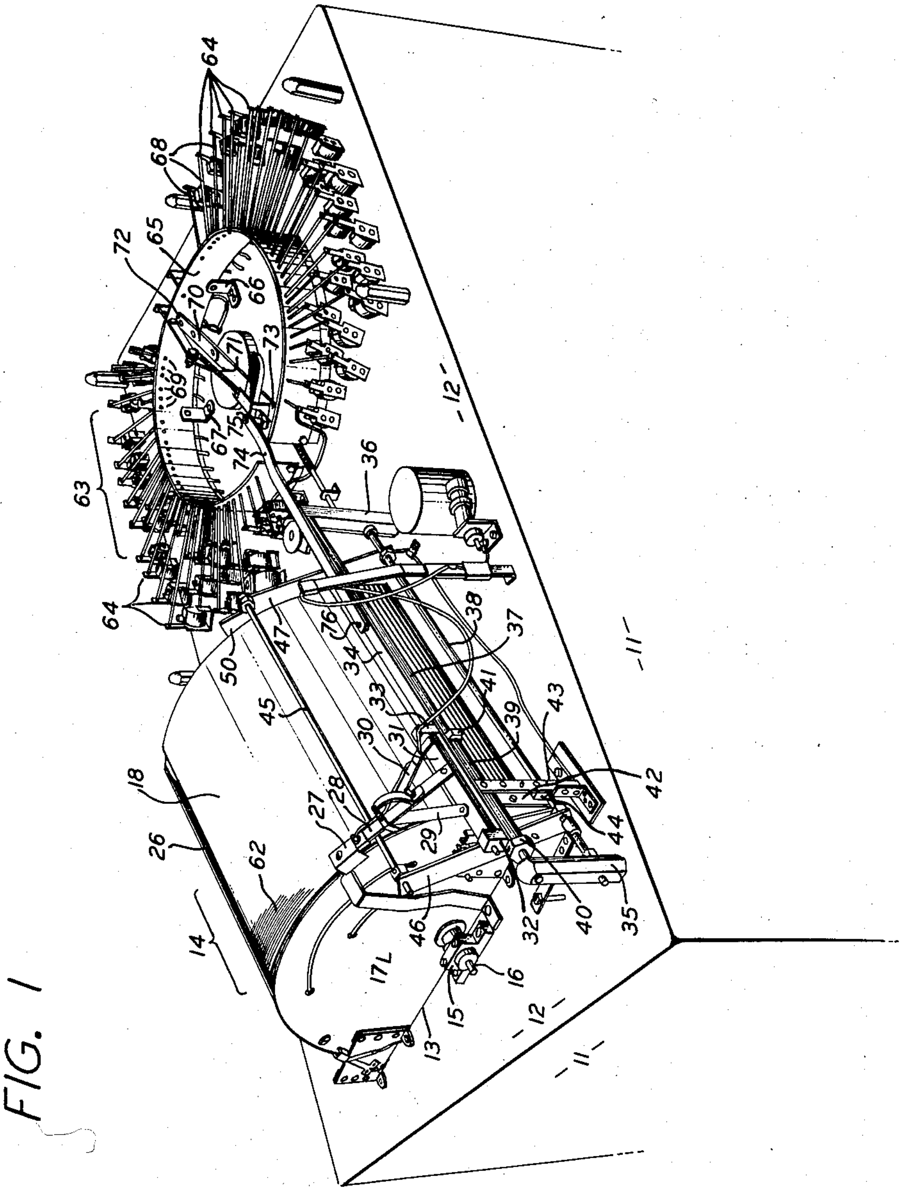
Figure 1 is a diagrammatic perspective view of a drum-type of transport for a multiple recording medium connected with a sound track selecting mechanism and linkage means for positioning a magnetic recording and reproducing head, constructed in accordance with my invention.

For a more detailed description of the invention in the form of the system briefly outlined above and illustrated schematically in the diagram of Figure 5, reference is now made to Figure 1 in which the numeral 11 designates an upright console type of supporting structure having a rigid and generally horizontal planar mounting surface 12 with a rectangular cutout provided therein, as best seen at 13, dimensioned to receive the drum 14.

Figure 7:
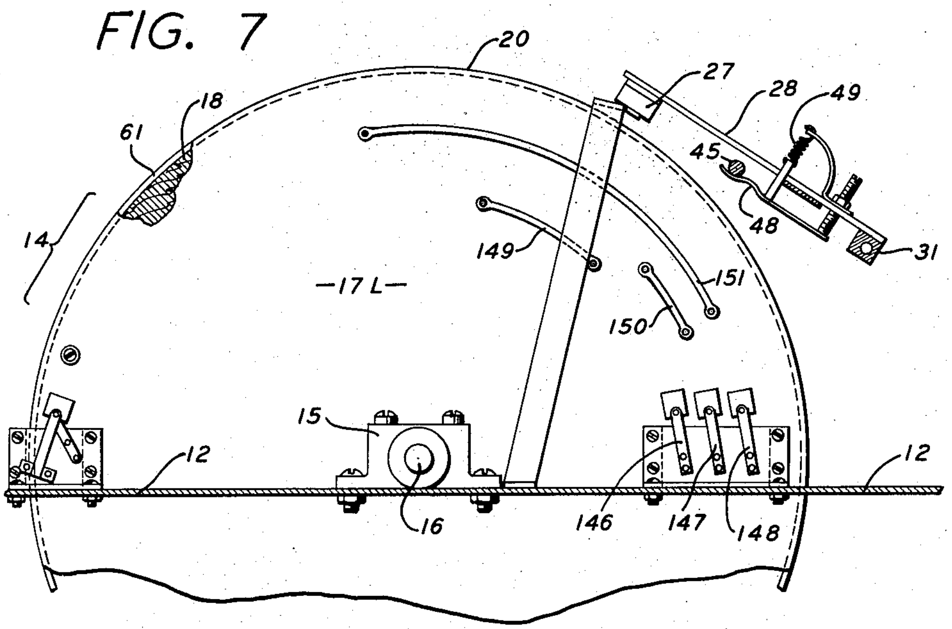
Figure 7 is a fragmentary elevational view of the end of the transport drum opposite from the end seen in Figure 6, showing the cam members and electrical contacts on its circular face, and the magnetic head adjacent to the recording medium on the drum surface.

The drum 14 is positioned in the cutout 13 by journal members, such as 15, engaging the shaft 16 disposed axially of the drum 14, as can be better seen in Figure 7.

Figure 6:
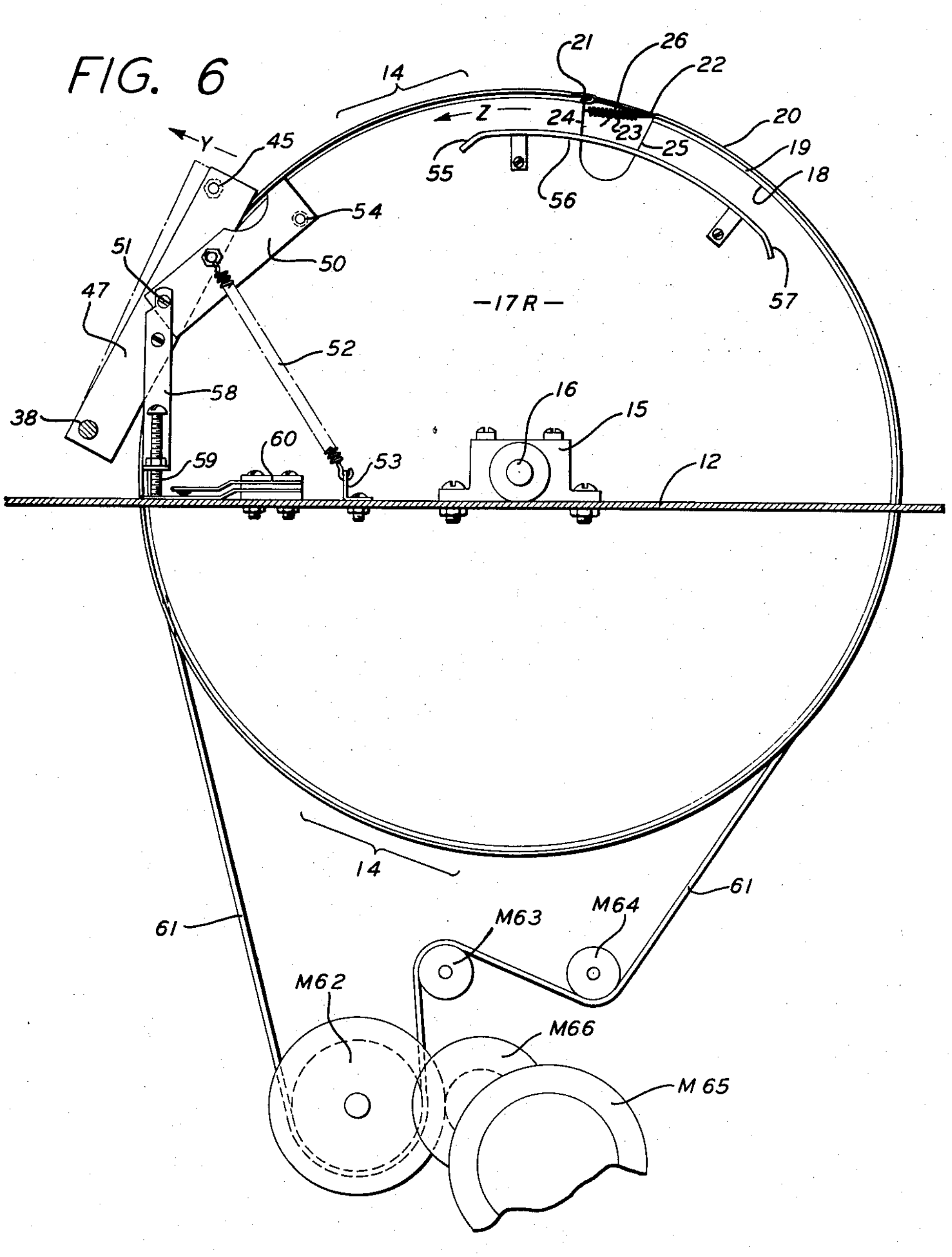
Figure 6 is an elevational view of the inwardly disposed side of the transport drum showing the motor drive with its intermediate friction disc and belt driving the drum, and the arcuate cam on the drum for raising and lowering the magnetic head.

The circular ends 17–R and 17–L better seen in Figures 6 and 7 respectively, of the drum 14 are rigidly conformed as also is the cylindrical periphery, seen at 18 in Figure 7. A pad member 19 is secured to the outer surface 18 of the drum, and exteriorly of the pad a sheet or band of magnetically responsive recording material 20 is stretched smoothly around the surface of the drum and held firmly in place by means of a channelled hook 21 in Figure 6 and a clamp 22 secured by spring means 23 along the parallel edges 24 and 25 of an axially aligned slot 26 in the periphery 18 of the drum 14 in much the same manner as that in which a mimeograph stencil is held in place.

The magnetic head 27, shown in relation to the other units of the device in the perspective view of Figure 1 and seen considerably enlarged in the elevational view of Figure 7, is adaped for recording as well as reproducing prerecorded sound tracks upon the surface of the magnetically responsive recording material 20 which is circumferentially disposed on the drum 14.

The head 27 is held in position adjacent the drum 14 and adapted for relative movement into and out of contact with the recording medium 20 thereon by a traveler assembly including a main bracket 28 supported by two diagonal strap members 29 and 30 fixedly attached to a section of square rod 31 which is disposed axially parallel to the axial shaft 16 of the drum 14, and is journalled into the end blocks 32 and 33 which are extended upwardly from a longitudinally extended and horizontally disposed strap member 34. In this manner, the head 27 is adapted to rotate radially of the strap 34 to make or terminate contact with the recording medium 20.

The strap 34, in turn, is maintained in a horizontal plane and is also adapted for sliding movement parallel to the longitudinal axis of the drum 14 by means of a track and guide assembly which includes a pair of spaced upright post members 35 and 36 fixedly attached to the mounting surface 12 beyond the ends 17–L and 17–R of the drum 14, and aligned in a plane being perpendicular to the mounting surface 12 and parallel to the shaft 16 of the drum 14. A pair of guide bars 37 and 38 are fixedly attached to and extended between the posts 35 and 36, and are mutually parallel to the mounting surface 12.

A tubular member 39 is fitted with end bushings 40 and 41, the bushings having axially aligned bores therein dimensioned to slidably receive the upper guide bar 37, and the strap member 34 is fixedly attached to these bushings so that the head portion of the traveler assembly, in addition to being rotatable radially, is also slidable longitudinally of the drum 14 along the guide bar 37. A pair of vertically disposed parallel strap members 42 and 43 are downwardly extended from the strap 34 and the tubular member 39, and transverse shaft between the members 42 and 43 serves to support rotatably a sheave 44 so that its grooved circumferential edge engages the lower guide bar 38 to hold the traveler assembly strap member 34 in a substantially horizontal plane and the rest of the traveler assembly including the magnetic head 27 in constant relatively upright positioning.

Completing the track and guide means assembly is a lift bar 45 which is supported by two arm members 46 and 47 which are pivotally attached at their opposite ends to the lower guide bar 38, thereby making the lift bar 45 rotatable relative thereto.

The lift bar 45, as will be best seen in Figure 7, is disposed beneath the bracket 28 which supports the head 27, and is effective to raise the head from the recording medium by exerting upward pressure against the bracket 28, or hold it in contact with the recording medium by downward pressure against the leaf spring 48 and the tension means 49 related thereto.

The mechanical means by which the raising and lowering of the head 27 are synchronized with the movements of the drum 14, will be best understood by reference to Figure 6 which shows the arm member 47 pivoted to the lower guide bar 38 and being attached to the lift bar 45 adjacent its upper end. Disposed diagonally from the arm 47 is a short arm member 50 which is pivotally attached to the former at 51 and is maintained in disengaged positioning as shown in the figure by means of a spring 52 which is held in tension by attachment to an angle bracket 53 secured to the mounting surface 12. A cam follower 54 is disposed inwardly of the arm 50 and is engaged, as the drum 14 rotates in the direction of the arrow Z, by the downwardly slanted leading edge 55 of the arcuate cam member 56 thereby moving the short arm 50 outwardly and the arm 47 backwardly in the direction of the arrow Y sufficiently to effect disengagement of the magnetic head 27 from the recording medium. Movement of the arm 50 causes proportionate movement of the angle bracket 58 and of the pressure pin 59 attached thereto relative to the mounting surface 12 and the contact members of the switch 60 mounted thereon.

Also shown in Figure 6 is the positioning of the cam 56 relative to the slot 26 in the surface 18 of the drum 14 along the edges of which the ends of the band of recording medium 20 are secured, as previously explained. Since the cam 56 is effective to lift the head 27 out of contact with the recording medium while the cam follower 54 moves from the leading edge 55 of the cam 56 to its termination at 57, it is apparent that the head 27 will be out of contact during the time the slot 26 passes thereunder.

The general arrangement of the drum driving means is shown schematically in Figure 6, and is seen to include a drive belt 61, a belt engaging drive wheel M62, belt tension idlers M63 and M64, an electric motor M65 with a friction type power transfer wheel M66 communicating power from the motor to the belt engaging drive wheel M62.

As was mentioned heretofore, a plurality of individual sound tracks is juxtaposed across the surface of the recording medium as shown at H in the schematic diagram of Figure 5 and as suggested at 62 in Figure 1, but the individual tracks are not widely spaced as indicated in the diagram. Actually in the pilot model of the device being tested concurrently with the filing of this application, the tracks are recorded approximately ten to the inch, and well over one hundred different voice tracks are carried on the band of recording material disposed about the drum of the machine. This point is mentioned without any intention of making it a limiting factor in the invention since the number and spacing of the tracks is a purely arbitrary matter, but instead to indicate the accuracy with which the track selection and head positioning mechanisms must operate.

The track selection mechanism is shown collectively at 63 in the perspective view of Figure 1 and in fragmentary plan and sectional views in Figures 2 and 3, and reference is first made to Figure 1 in which the assembly 63 is seen to include a plurality of individual pin positioning devices 64, which will be described in greater detail hereinafter, radially disposed outwardly of a circular collar 65 fixedly attached to the mounting surface 12 by angle brackets such as those indicated as 66 and 67, with the pin members 68 of each of the pin positioning devices 64 entered in holes 69 bored in coplanar alignment at spaced intervals around the circumference of the collar 65. A rotatable selector arm 70 is mounted on a vertical shaft for rotation relative to the central point 71 which is also the center of the collar 65 and the point toward which the plurality of pins 68 are all concentrically aligned.

The selector arm 70 is dimensioned in length so that its pin contact end 72 is immediately adjacent the inner surface of the collar 65 yet rotates clear of the collar until engaged by one of the pins 68 extended inwardly of one of the holes 69. The opposite end 73 of the selector arm 70 is provided with supporting means for a linkage arm 74 which is pivotally attached to the selector arm at 75 and at 76 to the strap member 34 of the traveler assembly previously described.

Figure 2:
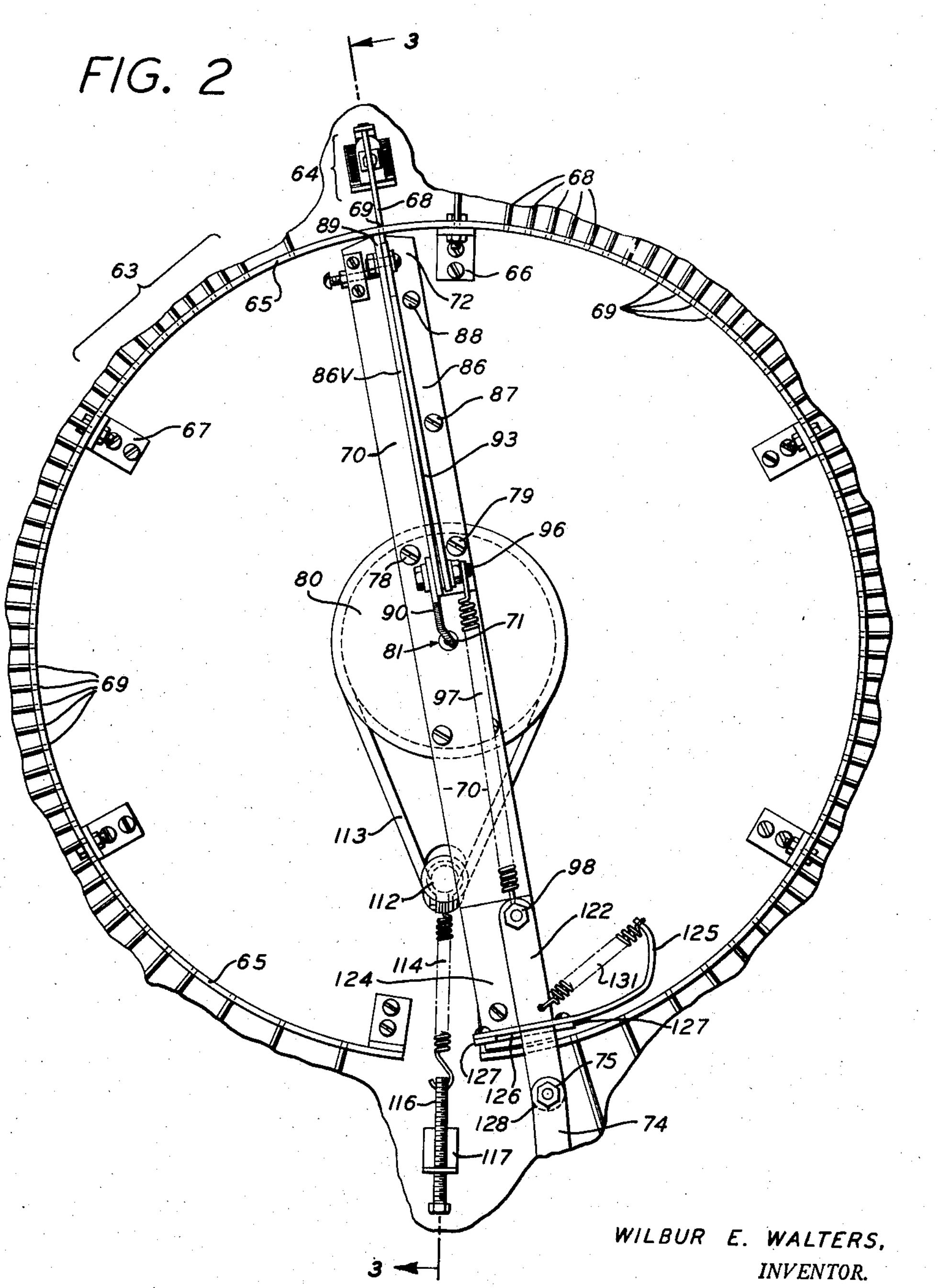
Figure 2 is a fragmentary plan view of the track selecting and head positioning mechanism of Figure 1 showing the conformation of the selector arm and the manner in which it rotates between, and is engaged by, the positioning pins.
Figure 3:
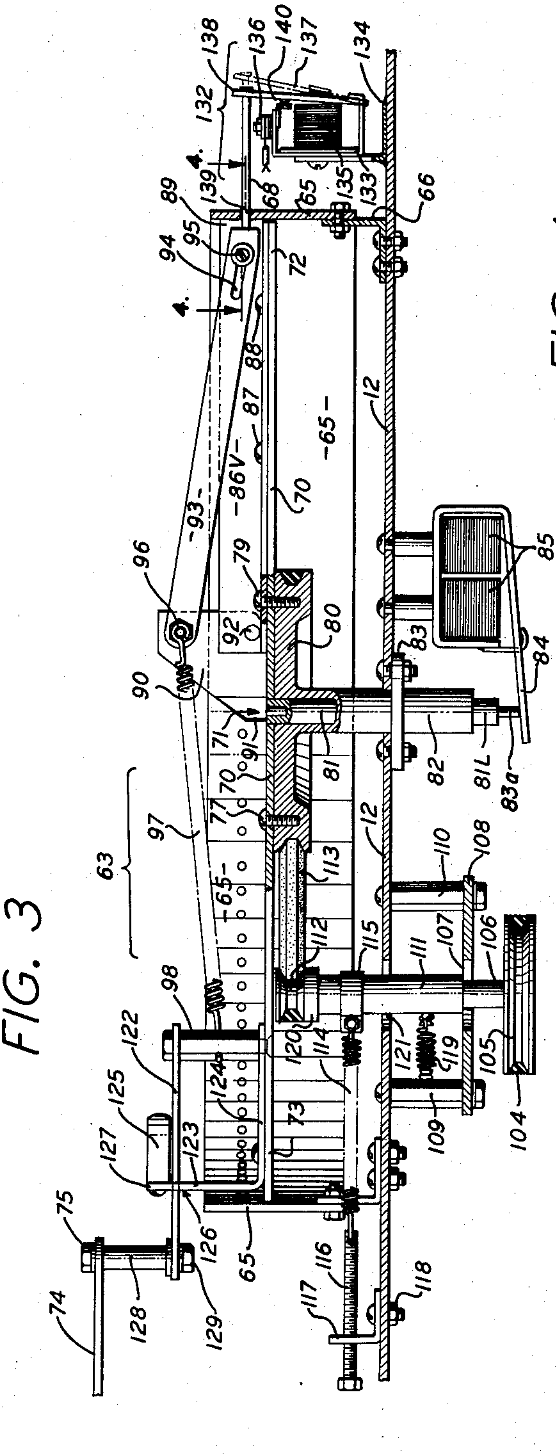
Figure 3 is a vertical sectional view taken generally along the line 3—3 in Figure 2 as seen from the direction of the arrows.

The selector arm 70 is attached by means of screws 77, 78 and 79 to a pulley member 80 as is well shown in Figures 2 and 3. The pulley 80 is free to rotate about a hollow shaft 81, the lower portion 81–L of which is secured within the journal member 82 which is fixed attached by means of a mounting bracket 83*a* to the underside of the mounting plate 12. A loose pin 83 is movable vertically through the central bore of the hollow shaft 81 when forced upwardly by the armature plate 84 reactive to the magnetic coils 85.

An angle section having a horizontal side 86 and a vertical side 86–V is attached to the selector arm 70 by the bolts 87 and 88 as seen in Figure 2, with the vertical portion 86–V upwardly disposed along the longitudinal centerline of the arm 70 as shown in Figure 3. The end 89 of the vertical portion 86–V disposed immediately adjacent the inner wall of the collar 65 is reduced in thickness, as best seen in Figure 4, mainly so that an adjacent pin just back of the one engaged can come in without any possibility of hitting the end of 86–V; the pins in certain cases possibly being so close together that, if the pin back of the engaged pin should be activated, it might then hit the edge of 86–V and prevent it from coming in—this reduction in thickness being only necessary in the event that the metal thickness at some places may be thicker than the spacing of the pins.

A generally right triangular rocker plate 90 is vertically disposed adjacent the side of the vertical portion 86–V spaced from the bolts 87 and 88 with one of its tapered ends 91 positioned over the axial center 71 of the centerbore in the hollow shaft 81 so as to be engaged by the loose center pin 83 when it is moved upwardly as previously described, and is pivotally attached to the vertical portion 86–V at 92. A diagonally disposed thrust rod 93 having a longitudinally disposed slot 94 adjacent one end thereof, is slidably attached to the portion 86–V by means of the bolt 95 and is pivotally attached to the rocker plate 90 adjacent its upper end by the bolt 96. The spring member 97, disposed between the bolt 96 and the post 98 disposed upwardly from the selector arm 70 adjacent its end 73, serves to maintain the rocker plate 90 in a vertical position and to hold the thrust arm 93 with its end adjacent the slot 94 positioned inwardly of the end 89 of the vertical portion 86–V, and in direct lineal alignment and end-to-end abutment with a positioning pin such as 68 as best shown in Figure 4.

Figure 4:
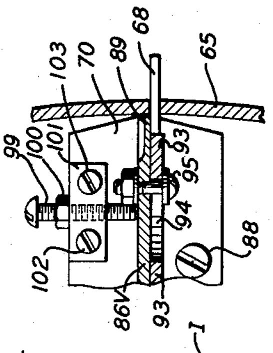
Figure 4 is a plan view of the contact end of the selector arm shown slightly enlarged and in horiozntal section taken along the line 4—4 in Figure 3 as it would appear from the direction of the arrows.

Means for adjusting the vertical disposition of the vertical portion 86–V and for absorbing some of the impact resulting from the engagement of the rotating end 89 of the selector arm 70 with one of the positioning pins 68, is provided by the set screw and locknut 99 and 100 which are positioned as required relative to the threaded block 101 which is fastened by bolts 102 and 103 to the selector arm 70, as shown in Figure 4.

To facilitate rapid movement of the selector arm 70, including power for quick starts and slippage between the motor and the arm as the motor coasts to a stop after the arm has been engaged by a positioning pin, a rather unconventional type of spring tensioned belt drive is provided and is shown in vertical section in Figure 3.

A motor, not shown in the figure, drives the belt 104 turning the pulley 105 which is mounted on the shaft 106 entered upwardly through a slot 107 in the supporting plate 108 suspended beneath the mounting plate 12 by the downwardly disposed post members 109 and 110. The shaft 106 rotates in the tubular journal member 111 which is larger in diameter than the width of the slot 107, and consequently is supported vertically by the plate 108. A small pulley, 112, is fixedly attached to the upwardly disposed end of the shaft 106, and the weight of the shaft 106 and the pulleys 105 and 112 is carried by the thrust bearing 120 shown between the pulley 112 and the upwardly disposed end of the journal member 111. The belt 113 transmits power from the pulley 112 to the large pulley 80 on which the selector arm 70 is mounted. The tubular journal member 111 is entered through a slot 121 in the mounting surface 12 in which it is movable relative to the pulley 80, and tension means including the spring 119 between the journal member 111 and the post 109 and the spring 114 attached to the band 115 around the journal member 111 and at its other end to the adjusting screw 116 threadably engaged in the bracket 117 attached to the mounting surface 12 by the bolt 118, are provided to maintain the shafts 106 and 81 in substantially parallel vertical alignment and to impose suitable driving tension in the belt 113.

At the linkage end 73 of the selector arm 70, a horizontally disposed linkage band 122 is pivotally attached to the top of the vertical post 98 upwardly extended from arm 70 and is supported in the horizontal plane by the upwardly extended portion 123 of an angle bracket the base of which 124 is fixedly attached to the selector arm 70. The sides of the vertical portion 123 of the bracket are extended upwardly from the underside 126 of the band 122 as shown at 127 in Figures 2 and 3 to provide points of attachment for a transversely disposed L-shaped bracket 125. The bracket 125 serves both to hold the band 122 between the upward extensions 127 of the bracket portion 123, and to position one end of a tension spring 131 which is attached at its other end to the linkage band 122. As will be readily understood, the spring 131 is effective to absorb thrust transmitted through the linkage members from the traveler assembly when the arm makes quick starts and stops, or when the thrust is transferred from one side to the other as the selector arm 70 revolves diametrically within the collar 65.

So that the selector arm 70 may revolve without interference with the linkage member 74, another post member 128 is disposed upwardly from the end of the band 122 spaced from the post 98, and is secured to the band 122 by the nut 129 and is pivotally attached at 75 to the linkage member 74 which, in turn, is pivotally attached at 76, as seen in Figure 1, to the longitudinally extended strap member 34 of the head supporting traveler assembly.

As is clearly shown in the vertical sectional view of Figure 3, the upward spacing above the selector arm 70 provided by the post 98 and the support bracket 123 is required to elevate the linkage band 122 above the upper edge of the collar 65, and the additional upward spacing provided by the post 128 to the final point 75 of pivotal attachment of the linkage member 74 to the selector arm 70, is required to permit free and complete rotation of the selector arm 70 together with the rocker plate 90 and the thrust rod 93 attached thereto as the pivot point 75 is moved around the circumference of the collar 65 during rotation of the selector arm 70 about the axis 71.

Three separate factors are particularly important in effecting the rapid operation of the reproducing mechanism which requires just a very few seconds from the initiating impulse until the commencement of the responsive sound track reproduction; one is the method employed in recording the sound tracks successively across the width of a band of recording medium, with each track starting from a common, axially parallel starting line; another factor is the arrangement for application of power to the selector mechanism an instant after the drum transport has begun to rotate, and a further factor is the plurality of means employed to release the selector mechanism from any position at which it has been held during the reproduction of the corresponding sound track, thus leaving it free to move to another selected position or to return to the neutral, normally inoperative, position.

The stop pin positioning device, a plurality of which are shown or indicated in Figures 1 and 2, plays a very important part in the quickly responsive performance of the mechanism. A typical pin positioning device is seen in a side elevational view in Figure 3 and is designated by the numeral 132. The device includes a frame 133 and mounting base 134, a magnetic coil 135 and an electrical terminal 136. When electric current is directed through the coil 135 the armature moves from the position indicated at 137 to the closed position shown at 138, and the pin 68 which is pivotally attached to the upwardly disposed end of the armature 138 is extended through a hole in the collar wall 65 as shown at 139.

When the pin and armature are in the closed position as described, the contact points at 140 are also closed and are effective to maintain an electrical circuit through the coil 135 after the momentary initiating electrical impulse has terminated. As a result, the pin end 139 remains inwardly of the collar 65, and engages the end 89 of the selector arm 70 until the sound track corresponding therewith has been reproduced, whereupon the pin end 139 is pressed outwardly of the hole in the collar wall 65 and the selector arm 70 is freed to rotate until engaged by another positioning pin, as will be more fully explained subsequently in the following description of the electrical circuitry and its sequential operation.

Figure 9:
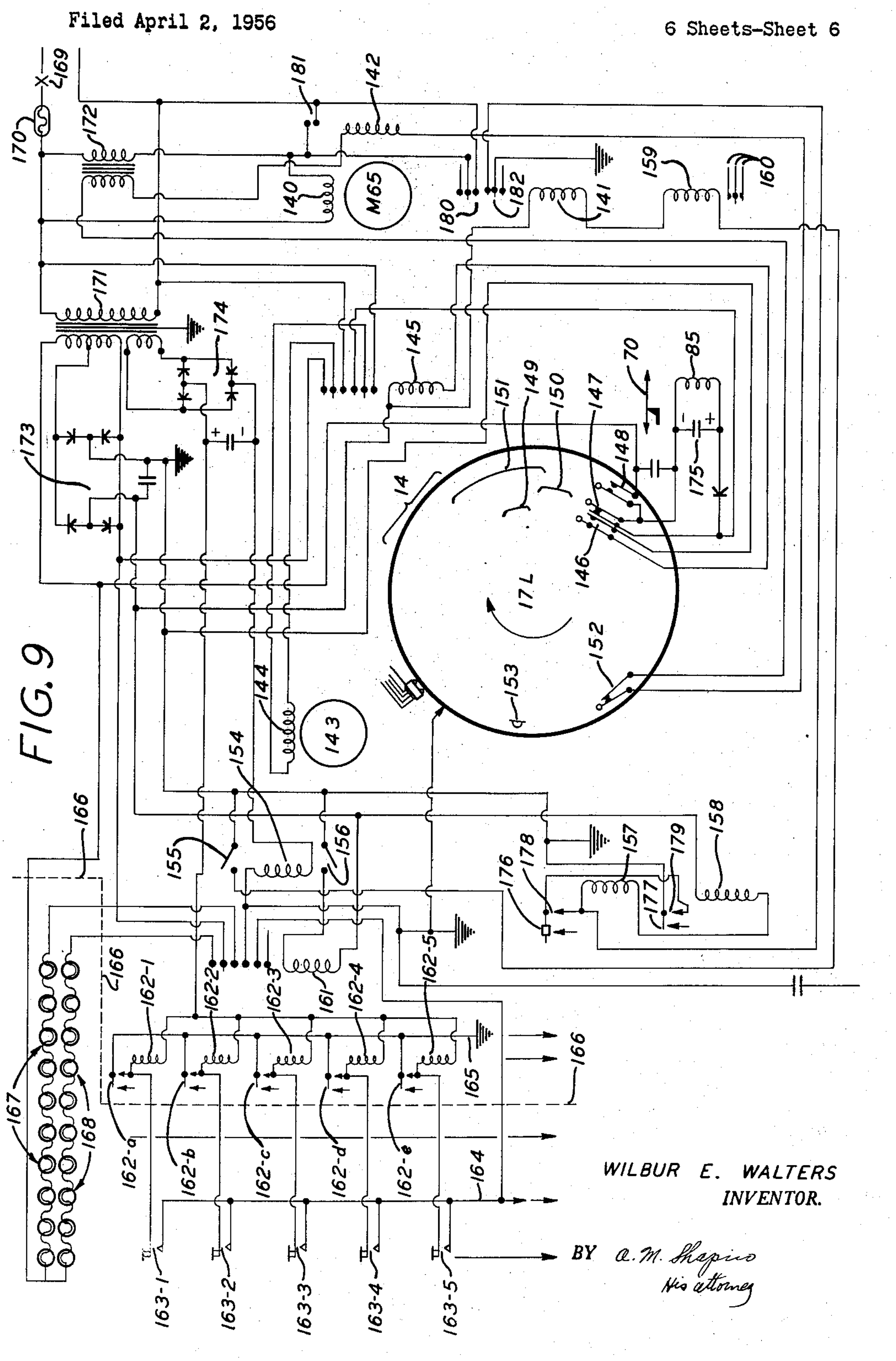
Figure 9 is a schematic electrical wiring diagram of a typical system utilizing the essential elements of my present invention.

Figure 9 illustrates schematically the electrical control circuits and some of the mechanical parts of the selective sound track reproducing apparatus of my invention. Previously described mechanical and electrical parts are designated by the original numerals whenever possible to do so. Various electrical circuits and components have not been illustrated in detail because they are well known in the general art and the inclusion of them in the diagram would merely detract from an understanding of my invention in this specific application.

Conversely, many of the components included in this specific embodiment and illustrated herewith are not essential to the operation of the basic apparatus, but they have been included because a prototype suitable for use in a large retail food market has been assembled, embodying these components, and they may help to illustrate the adaptability and at least one use of the invention.

For a quicker understanding of the diagram of Figure 9, reference is first made to certain major mechanical elements previously identified and described. Recognizable in the diagram is the circular end 17–L of the transport drum 14 which is seen from the same direction as the end elevational view in Figure 7. The drum motor, designated by the numeral 65 in Figure 6, is also designated by the same number in the diagram where it is seen to be associated with its primary winding 140, the drum motor starting relay 141, the drum motor stopping relay 142, and the contact release switch 152 actuated by the cam 153 on the end face 17–L of the drum 14.

The motor which drives the selector arm, designated as 70 in various of the figures, is shown at 143 and is associated with its primary winding 144, and the selector motor booster relay 145 which operates in conjunction with the selector arm release magnet designated previously by the numeral 85 in Figure 3. The action of these controls related to the operation of the selector arm 70 is, in turn, associated with the roller actuated switches 146, 147 and 148 and their respective engagement and disengagement with the arcuate cams 149, 150 and 151 outwardly disposed from the end face 17–L of the drum 14.

Figure 8:
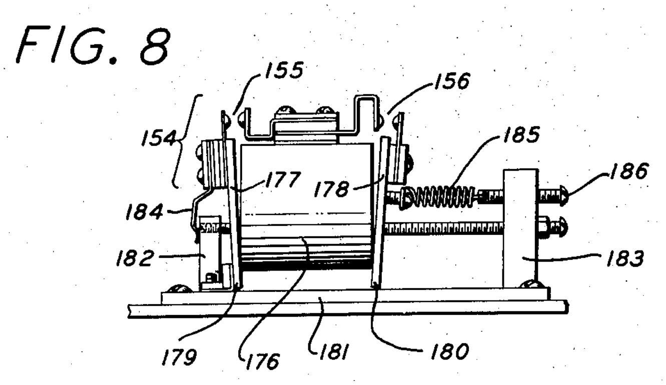
Figure 8 is a side elevational view of the double action relay which transmits power to the magnets of the positioning pins, and shows the adjustments and biasing means on its two armatures.

Another important control element identified in the diagram and in Figure 8 is the master current and limiting relay 154 which may be considered to be the electrical heart of the apparatus since it starts the operation of the machine by means of its start contacts 155 and limits the number of push buttons that can be pressed in advance by means of its control contacts at 156. This master current relay 154 is shown in some mechanical detail in Figure 8 and constitutes an electromagnet which is operative on both ends. A coil 176 is disposed between two armatures 177 and 178 which are hinged at 179 and 180 respectively to a basal member 181 which is provided with mounting posts 182 and 183 to which are attached tension biasing springs 184 and 185 which are, in turn, attached to the armatures 177 and 178 respectively. The spring tension is relatively adjusted so that the contacts 155 close when one push button is pressed, while the contacts at 156 remain open until the current input of three push buttons has been impressed upon the coil 176. Adjustment of the tension in spring 185 by means of screw 186 threaded into the post 183 determines the number of buttons which may be pressed before the contacts close and energize the "wait" signal as will be further explained hereinafter.

Other control elements cooperating in the circuit include: the series connected idler stops 157 and 158, the coils of which are energized while the apparatus is in a quiescent state, thereby holding their stop pins (not shown in the diagram) inwardly of the collar 65 as indicated at 139 in Figure 3 to forestall random movement of the selector arm 70; the amplifier control relay which is shown at 159 and its switch contacts at 160, but neither the lead wires to the amplifier nor the amplifier itself are shown in the diagram; the relay 161 which serves to operate the lights 167 and 168 in the illuminated signs at the top of the push button panels, the upper lights 167 illuminating a transparent sign reading "Standby, Two are Waiting" are lighted when the master current relay 154 is overloaded replacing the normally on lights 168 which illuminate a sign at the top of the panel reading "Press Buttons to Find": and directing the customers' attention to the alphabetical list of articles available in the store; and the selector arm release magnet 85 which has been previously described in connection with Figure 3.

Also of prime importance in the operation of the apparatus are the five positioning pin magnetic stops at 162 which are indicated as 162—1, 162—2 etc., and their respective release contractors **162–*a*, 162–*b*, etc. A plurality of push buttons, indicated as 163—1, 163—2, etc., serve to energize the respective stop magnets. Actually, in the presently operating prototype of the machine, there are one hundred and twenty push buttons such as 163—1 and the same number of magnetic stops such as 162—1, and it is to be assumed that the lead wires 164 and 165** are suitably extended to include them in the circuit. Also in the prototype system, there are several push button panels, the buttons thereof being connected in parallel.

In the diagram, the dash line 166 is intended to indicate that the elements disposed to the left thereof are duplicated in any desired plurality of panel assemblies whereas the elements on the right of the line 166 comprise the single reproducing machine which is remotely disposed at any convenient location.

Additional components in the circuit which, for the sake of clarity, should be more specifically identified are the switch 169 and the fuse 170 through which one side of the incoming 110 volt A.C., 60 cycle electrical circuit is passed; a main power transformer 171 supplying current to operate all functions of the machine; a second transformer 172 which is an intermittent duty transformer and serves only to provide momentary contacts in stopping and starting controls; a rectifier filter system 173 for operating the relays which control the machine; a rectifier filter 174 for operating the magnetic stops, and a rectifier filter 175 for operating the selector arm release magnet.

When the connector cord of the machine is connected to the 110 volt current supply and the switch 169 is turned on, the transformer 171 is energized and current flows to the lights 168 on the push button panel and through the coils of the idler magnetic stops 157 and 158 causing their armatures 176 and 177, respectively, to move toward the coils and thereby extend the stop pins attached to the armatures through the collar 65 to engage the selector arm 70, as has been previously explained. Movement of the armatures 176 and 177 causes the contacts 178 and 179 to close and maintain the flow of current impressed upon the coils. These are the only immediate responses of the machine when the current is turned on.

Pressure upon any one push button, however, causes a number of sequential reactions within the electrical circuit and of the mechanical components of the machine. Pressing a button such as 163—1, energizes the coil of the respective magnetic stop 162—1, causing the armature thereof to move toward the coil and thrust the stop pin attached to the armature through the collar 65 so as to engage the end of the selector arm 70. Concurrently electrical current flows into the coil of the master current relay 154 causing its starting contacts 155 to close thereby directing current to the coil of the relay 141 and closing its contacts 180 which serve both to supply current to the primary winding 140 of the drum motor M–65 and to energize the transformer 172. When thus energized, the transformer 172 impresses current upon the coil of the relay 142 causing its contacts 181 to close and maintain the current supply to the drum motor coil 140. Operation of the relay 141 also serves to open a pair of contacts 182 removing the current from the coils of relays 157 and 158, allowing their contacts 178 and 179 to open and the stop pins attached to the armatures 176 and 177 removed from engagement with the selector arm 70. Completing this particular sequence in the functions of the electrical circuit, current is also impressed upon the coil of the relay 159 thereby closing contacts at 160 effective to operate the amplifier and speakers. The drum 14 is now turning and subsequent control operations are regulated by cams thereon.

As the drum 14 rotates clockwise as indicated on the diagram, the head lift cam, previously shown and described, which is on the other end of the drum, lifts the pick-up head clear of the drum surface. Thereupon, the arcuate cam 150 engages and opens the normally closed contacts 147 thereby releasing the short circuit previously established across the relay 85 and its filter network 175. No current is flowing in the circuit when the contacts 147 are first opened, but they are held open until the cam 151 closes the normally open contacts 148 for a brief period before the cam 150 ceases to hold the circuit open, and during this interval current from the motor supply circuit flows through the filter system 175 serving the coils 85 which power the selector release mechanism to remove the stop pins at 176 and 177, as has been previously described, and permitting the selector arm 70 to revolve into engagement with the stop pin such as that at **162–*a***.

As cam 150 passes the contacts 147, they reclose, and immediately thereafter the cam 149 engages and closes the contact 146 thereby sending high voltage current to the coil 144 of the selector motor 143, causing the selector arm 70 to rotate rapidly into engagement with the stop pin previously positioned by operation of the push button. This high voltage current flows only while the cam 149 passes the contacts 146, and after this initial surge of current the selector arm motor 143 operates on the normal low voltage supply made available through the contacts 148.

When the drum 14 has rotated to the point at which the cam 151 passes its respective contacts, the head lift cam 56 on the opposite side of the drum lowers the pick-up head 27 into contact with the recording medium 20 on the surface of the drum; reproduction of the recorded sound track then begins and continues until the cam 153 on the drum end face 17–L engages the normally closed contacts 152, causing them to open and remove the current from the coil of the holding relay 142, thereby opening the contacts 181 and breaking the motor supply circuit. Meanwhile movement of the cam 151 beyond the contacts 148 has been effective to discontinue the supply of current to the selector arm motor 143, and the arm has come to rest against the idler stop pin positioned by the armature 176, thereby completing the operational cycle.

As has been indicated previously, any three push buttons may be pressed in advance, and the corresponding sound tracks will be reproduced sequentially before the selector arm returns to the idling position.

As has also been indicated, the mechanism is equally well adapted for recording sound tracks as for reproducing them, and in the prototype system now being tested, a monitor room has been equipped with duplicate push buttons and a microphone so that, with suitable switching arrangements, any of the sound tracks may be played back in the monitor room independently of the general speaker system, and any of the sound tracks may be re-recorded by means of the microphone when changes in the recorded messages are desired.

*Conclusion*

As mentioned in the prefatory paragraphs of this application, the apparatus specifically described and claimed herein is an alternate modification of the invention specifically described and claimed in the hereinbefore mentioned earlier application co-pending herewith (both forms being generically claimed in said earlier application), and numerous variations of the generic aspects and/or the specific aspects of the several alternate modifications of the invention will occur to those skilled in the art after careful study hereof, and all such are intended to be included and comprehended herein as fully as if specifically described, illustrated and claimed.

For example, the pick-up head and the recording medium need be only relatively movable with respect to each other, so that the recording medium may be adapted to be stationary during the playback period while the pick-up head traversed the prerecorded sound track portion of the recording medium.

For another example, the plurality of stop members of the pick-up head positioning means may be effectively adapted to be selectively rotated while the control or selector member of the pick-up head positioning means remains stationary, accompanied by an effective adaptation of the coupling means for relative positioning of the pick-up head with respect to the recording medium. Another modification contemplates pick-up head positioning means having rectilinearly movable control member means effectively indexed by selectively actuatable stop members.

And while the invention has been specifically described in a form embodying sound track reproduction apparatus of the type adapted to play back non-spiral magnetically recorded sound tracks, the invention is not limited to this arrangement, but also encompasses arrangements embodying other types of reproduction apparatus adapted to play back other types of sound tracks. For example, a band of generally flexible plastic material with conventional grooved sound tracks recorded thereon may be employed with a needle type of pick-up head instead of the magnetic recording medium described in the present application.

Not only are variations contemplated in the type of recording and recording medium employed, but the electro-magnetic and electro-mechanical actuating means of the present and previous inventions may take a variety of forms and still remain well within the scope of this invention. Other modifications, within the spirit and scope of this invention, will be obvious to those skilled in the general art upon careful examination of this invention.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. Apparatus for reproducing any selected one of a plurality of recorded passages carried by recording medium, comprising: a pick-up head; a generally cylindrical drum member mounted for rotation about a longitudinal central axis thereof, said drum member having recording medium therearound bearing a plurality of axially spaced recorded passages, each extending arcuately about the drum axis; motor means operable to rotate said drum member; means for positioning said pick-up head longitudinally along said recording medium in any of a plurality of different selectable positions aligned respectively with said plurality of recorded passages, said pick-up head positioning means including position selector means comprising a rotatable control member and a plurality of circularly arranged stop members adjacent the path of the control member corresponding respectively to the selectable head positions and selectively movable relative to said control member from an inoperative position to an operative position engageable by the control member to stop rotation of the latter with the head aligned with one of said passages; and said pick-up head positioning means also including mechanical coupling means comprising circular-to-straight movement translating crank means coupling the rotatable control member to the pick-up head to move the latter longitudinally of the medium on rotation of the control member.

2. Apparatus for reproducing any selected one of a plurality of recorded passages carried by recording medium, comprising: a pick-up head; a generally cylindrical drum member mounted for rotation about a longitudinal central axis thereof, said drum member having recording medium therearound bearing a plurality of axially spaced recorded passages, each extending arcuately about the drum axis; motor means operable to rotate said drum member; means for positioning said pick-up head longitudinally along said recording medium in any of a plurality of different selectable positions aligned respectively with said plurality of recorded passages, said pick-up head positioning means including position selector means comprising a rotatable control member and a plurality of circularly arranged stop members adjacent the path of the control member corresponding respectively to the selectable head positions and individually and selectively movable relative to said control member from an inoperative position to an operative position engageable by the control member to stop rotation of the latter with the head aligned with one of said passages; said pick-up head positioning means also including mechanical coupling means comprising circular-to-straight movement translating crank means consisting of connecting rod means coupled adjacent a first end to said rotatable control member at a location spaced from the center of rotation thereof and coupled adjacent a second end to said pick-up head to move the head on rotation of the control member; and means to guide said second end of said connecting rod along a line substantially parallel to said longitudinal axis of said drum member, thereby to position the head longitudinally of the medium in a selected longitudinal position determined by the particular stop member selectively actuated by an operator of the apparatus.

3. Apparatus for reproducing any selected one of a plurality of recorded passages carried by recording medium, comprising: a pick-up head; a generally cylindrical drum member mounted for rotation about a longitudinal central axis thereof, said drum member having recording medium therearound bearing a plurality of axially spaced recorded passages, each extending arcuately about the drum axis; motor means operable to rotate said drum member; means for positioning said pick-up head longitudinally along said recording medium in any of a plurality of different selectable positions aligned respectively with said plurality of recorded passages, said pick-up head positioning means including position selector means comprising a rotatable control member and a plurality of circularly arranged stop members adjacent the path of the control member corresponding respectively to the selectable head positions and individually and selectively movable relative to said control member from an inoperative position to an operative position engageable by the control member to stop rotation of the latter with the head aligned with one of said passages; said pick-up head positioning means also including mechanical coupling means comprising circular-to-straight movement translating crank means coupling the rotatable control member to the pick-up head to move the latter longitudinally of the annular medium on rotation of the control member; and motor means operable to rotate said control member with respect to said plurality of stop members, said motor means being selectively energizable in response to actuation of any selected stop member to cause rotation of said control member relative to said stop members into a selected position determined by the selected actuated stop member.

4. Apparatus for reproducing any selected one of a plurality of recorded passages carried by recording medium, comprising: a pick-up head; a generally cylindrical drum member mounted for rotation about a longitudinal central axis thereof, said drum member having recording medium therearound bearing a plurality of axially spaced recorded passages, each extending arcuately about the drum axis; motor means operable to rotate said drum member; means for positioning said pick-up head longitudinally along said recording medium in any of a plurality of different selectable positions aligned respectively with said plurality of recorded passages, said pick-up head positioning means including position selector means comprising a rotatable control member and a plurality of circularly arranged stop members adjacent the path of the control member corresponding respectively to the selectable head positions and individually and selectively movable relative to said control member from an inoperative position to an operative position engageable by the control member to stop rotation of the latter with the head aligned with one of said passages; said pick-up head positioning means also including mechanical coupling means comprising circular-to-straight movement translating crank means consisting of connecting rod means coupled adjacent a first end to said rotatable control member at a location spaced from the center of rotation thereof and coupled adjacent a second end to said pick-up head to move the head on rotation of the control member; and means to guide said second end of said connecting rod along a line substantially parallel to said longitudinal axis of said drum member, thereby to position the head longitudinally of the medium in a selected longitudinal position determined by the particular stop member selectively actuated by an operator of the apparatus; and motor means operable to rotate said control member with respect to said plurality of stop members, said motor means being selectively energizable in response to actuation of any selected stop member to cause rotation of said control member relative to said stop members into a selected position determined by the selected actuated stop member.

5. Apparatus for reproducing any selected one of a plurality of recorded passages carried by recording medium, comprising: a pick-up head; a generally cylindrical drum member mounted for rotation about a longitudinal central axis thereof, said drum member having recording medium therearound bearing a plurality of axially spaced recorded passages, each extending arcuately about the drum axis; motor means operable to rotate said drum member; means for positioning said pick-up head longitudinally along said recording medium in any of a plurality of different selectable positions aligned respectively with said plurality of recorded passages, said pick-up head positioning means including position selector means comprising a rotatable control member and a plurality of circularly arranged stop members adjacent the path of the control member corresponding respectively to the selectable head positions and individually and selectively movable relative to said control member from an inoperative position to an operative position engageable by the control member to stop rotation of the latter with the head aligned with one of said passages; said pick-up head positioning means also including mechanical coupling means comprising circular-to-straight movement translating crank means consisting of connecting rod means coupled adjacent a first end to said rotatable control member at a location spaced from the center of rotation thereof and coupled adjacent a second end to said pick-up head to move the head on rotation of the control member; and means to guide said second end of said connecting rod along a line substantially parallel to said longitudinal axis of said drum member, thereby to position the head longitudinally of the medium in a selected longitudinal position determined by the particular stop member selectively actuated by an operator of the apparatus; said guide means comprising longitudinal guide rail means positioned in longitudinal closely laterally adjacent relationship with respect to the recording medium; and follower means slidable on the guide rail means, pivotally connected to said second end of said connecting rod means, and carrying said head.

6. Apparatus for reproducing any selected one of a plurality of recorded passages carried by recording medium, comprising: a pick-up head; a generally cylindrical drum member mounted for rotation about a longitudinal central axis thereof, said drum member having recording medium therearound bearing a plurality of axially spaced recorded passages, each extending arcuately about the drum axis; motor means operable to rotate said drum member; means for positioning said pick-up head longitudinally along said recording medium in any of a plurality of different selectable positions aligned respectively with said plurality of recorded passages, said pick-up head positioning means including position selector means comprising a rotatable control member and a plurality of circularly arranged stop members adjacent the path of the control member corresponding respectively to the selectable head positions and individually and selectively movable relative to said control member from an inoperative position to an operative position engageable by the control member to stop rotation of the latter with the head aligned with one of said passages; said pick-up head positioning means also including mechanical coupling means comprising circular-to-straight movement translating crank means consisting of connecting rod means coupled adjacent a first end to said rotatable control member at a location spaced from the center of rotation thereof and coupled adjacent a second end to said pick-up head to move the head on rotation of the control member; and means to guide said second end of said connecting rod along a line substantially parallel to said longitudinal axis of said drum member, thereby to position the head longitudinally of the medium in a selected longitudinal position determined by the particular stop member selectively actuated by an operator of the apparatus; said guide means comprising longitudinal guide rail means positioned in longitudinal closely laterally adjacent relationship with respect to the annular recording medium; and follower means slidable on the guide rail means, pivotally connected to said second end of said connecting rod means, and carrying said head; and motor means operable to rotate said control member with respect to said plurality of stop members, said motor means being selectively energizable in response to actuation of any selected stop member to cause rotation of said control member relative to said stop members into a selected position determined by the selected actuated stop member.

7. Apparatus for reproducing any preselectable passage of a plurality of recorded passages in closely adjacent laterally spaced tracks on a single record medium, comprising: a generally cylindrical drum rotatable about a longitudinal central axis thereof for supporting a magnetic record medium therearound bearing a plurality of axially spaced recorded passages extending arcuately about the drum axis, each of said recorded passages having a similar arcuate break therein with all of said arcuate breaks being longitudinally aligned in a recorded-passage-selection zone; drive means for rotating said drum to advance said tracks in the direction of their length past a pick-up head; a magnetic pick-up head; means supporting the pick-up head for indexing movement longitudinally along said selection zone to operative positions corresponding respectively to said passages; indexing means for moving said head supporting means to any of said positions; selector means controlling said drive means and said indexing means and operable for preselecting any of said passages for reproduction including a plurality of manually actuatable selectors corresponding respectively to said operative positions and means whereby each selector is operable to effect operation of said drive means and operation of said indexing means during passage of said selection zone past said head to position said head along said selection zone in the operative position corresponding to an actuated selector; and means for separating said playback head and said medium for indexing during passage of the selection zone past the head and then re-engaging the head and medium at the beginning of the selected passage.

8. Apparatus for reproducing any preselectable passage of a plurality of recorded passages in closely adjacent laterally spaced tracks on a single record medium, comprising: a generally cylindrical drum rotatable about a longitudinal central axis thereof for supporting a magnetic record medium therearound bearing a plurality of axially spaced recorded passages extending arcuately about the drum axis, each of said recorded passages having a similar arcuate break therein with all of said arcuate breaks being longitudinally aligned in a recorded-passage-selection zone; drive means for rotating said drum to advance said tracks in the direction of their length past a pick-up head; a magnetic pick-up head; means supporting the pick-up head for indexing movement along said selection zone to operative positions corresponding respectively to said passages; indexing means for moving said head supporting means to any of said positions; a stop engaging member movable with the indexing means and head supporting means; selector means controlling said drive means and said indexing means and operable for preselecting any of said passages for reproduction including a plurality of stop members corresponding respectively to said operative positions of the head, each stop member positionable to engage said stop engaging member to stop the latter with the head positioned for engagement with one track, a plurality of manually actuatable selectors corresponding respectively to said operative positions, and means rendering each selector operable to effect positioning of one stop member, operation of said drive means for a predetermined period and to activate said indexing means during passage of said selection zone past the head to position said head in the operative position corresponding to the actuated selector; and means for elevating said pick-up head for indexing during passage of the selection zone past the head and then lowering the head to operatively engage the selected track at the beginning of the selected passage.

9. Apparatus for reproducing a preselectable plurality of consecutive or non-consecutive recorded passages of a large number of passages in closely adjacent laterally spaced tracks on a single record medium, comprising: a generally cylindrical drum rotatable about a longitudinal central axis thereof for supporting a magnetic record medium therearound bearing a plurality of axially spaced recorded passages extending arcuately about the drum axis, each of said recorded passages having a similar arcuate break therein with all of said arcuate breaks being longitudinally aligned in a recorded-passage-selection zone; drive means for rotating said drum to advance said tracks in the direction of their length past a pick-up head; a magnetic pick-up head; means supporting the pick-up head for indexing movement along said selection zone to operative positions corresponding respectively to said large number of passages; indexing means for moving said head supporting means to any of said positions; a stop engaging member movable with the indexing means and head supporting means; selector means controlling said drive means and said indexing means and operable for preselecting a plurality of consecutive or non-consecutive passages for reproduction including a plurality of stop members corresponding respectively to said operative positions of the head, each stop member positionable to engage said stop engaging member to stop the latter with the head positioned for engagement with one track, a plurality of manually actuatable selectors corresponding respectively to said stop members, and means whereby each selector is operable to effect positioning of one stop member, operation of said drive means to rotate said drum a single revolution and operation of said indexing means to position said head in the operative position corresponding to an actuated selector during passage of the selection zone past the head; means for separating said head and medium during passage of the selection zone past the head for indexing and then re-engaging said head and medium at a predetermined position corresponding to the beginning of the selected passage; and means operating to render any plurality of preselected actuated selectors automatically operable to successively reproduce corresponding passages.

10. Apparatus for reproducing a preselectable plurality of consecutive or non-consecutive recorded passages of a large number of passages in closely adjacent laterally spaced tracks on a single record medium, comprising: a generally cylindrical drum rotatable about a longitudinal central axis thereof for supporting a magnetic record medium therearound bearing a plurality of axially spaced recorded passages extending arcuately about the drum axis, each of said recorded passages having a similar arcuate break therein with all of said arcuate breaks being longitudinally aligned in a recorded-passage-selection zone; means for rotating said drum to move said tracks in the direction of their length past a pick-up head; a magnetic pick-up head; means supporting the pick-up head for indexing movement along said selection zone to operative positions corresponding respectively to said large number of passages; indexing means for moving said head supporting means to any of said positions; selector means controlling said indexing means and operable for preselecting a plurality of consecutive or non-consecutive passages for reproduction including a plurality of stop members corresponding respectively to said operative positions of the head, each stop member movable between an inoperative position and an operative position engageable by the indexing means to stop the latter with the head positioned for engagement with one track, a plurality of manually actuatable selectors corresponding respectively to said stop members, and means whereby each selector is operable to position one stop member and energize said indexing means to position said head in the operative position corresponding to an actuated selector; means synchronizing energization of said head indexing means and said medium advancing means to advance the medium past the head after the head is indexed to a preselected operative position; and means operating to render any plurality of preselected actuated selectors automatically operable to successively reproduce corresponding passages.

11. Apparatus for reproducing any preselectable passage of a plurality of recorded passages in closely adjacent laterally spaced tracks on a single record medium, comprising: a generally cylindrical drum rotatable about a longitudinal central axis thereof for supporting a magnetic record medium therearound bearing a plurality of axially spaced recorded passages extending arcuately about the drum axis, each of said recorded passages having a similar arcuate break therein with all of said arcuate breaks being longitudinally aligned in a recorded-passage-selection zone; drive means for rotating said drum to advance said tracks in the direction of their length past a pickup head; a magnetic pickup head; means supporting the pickup head for indexing movement along said selection zone to operative positions corresponding respectively to said passages; indexing means for moving said head supporting means to any of said positions including a drive motor, means for energizing the drive motor at a low voltage, and a slip coupling enabling continued energization of the drive motor when the playback head is held against movement; selector means controlling said drive means and said indexing means and operable for preselecting any of said passages for reproduction including a plurality of stop members corresponding respectively to said operative positions of the head, each stop member positionable to engage the indexing means to stop the latter with the head positoned for engagement with one track, a plurality of manually actuatable selectors corresponding respectively to said operative positions, and means whereby each selector is operable to position one stop member, operable to energize said drive means for a predetermined period and operable to energize said indexing means drive motor at a high voltage to rapidly position said head in the operative position corresponding to the actuated selector during passage of the selection zone past the head.

12. Apparatus for reproducing a preselectable plurality of consecutive or non-consecutive recorded passages of a large number of passages in closely adjacent laterally spaced tracks on a single record medium, comprising: a generally cylindrical drum rotatable about a longitudinal central axis thereof for supporting a magnetic record medium therearound bearing a plurality of axially spaced recorded passages extending arcuately about the drum axis, each of said recorded passages having a similar arcuate break therein with all of said arcuate breaks being longitudinally aligned in a recorded-passage-selection zone; drive means for rotating said drum to advance said tracks in the direction of their length past a pickup head; a magnetic pickup head; means supporting the pickup head for indexing movement along said selection zone to operative positions corresponding respectively to said large number of passages; indexing means for moving said head supporting means to any of said positions including a drive motor, means for energizing the drive motor at a low voltage continuously, and a slip coupling enabling continued energization of the drive motor when the playback head is held against movement; selector means controlling said drive means and said indexing means and operable for preselecting a plurality of consecutive or non-consecutive passages for reproduction including a plurality of stop members corresponding respectively to said operative positions of the head, each stop member positionable to engage the indexing means to stop the latter with the head positioned for engagement with one track, a plurality of manually actuatable selectors corresponding respectively to said stop members, means rendering each selector operable to position one stop member, to energize said drive means for a predetermined period of rotation and to energize said indexing means drive motor at a high voltage during movement of the selection zone past the head to rapidly position said head in the operative position corresponding to an actuated selector; means for separating said head and medium during said indexing and then re-engaging said head and medium at a predetermined position corresponding to the beginning of the selected possage; and means operating to render any plurality of preselected actuated selectors automatically operable to successively reproduce corresponding passages.

13. Apparatus for reproducing any preselectable passage of a plurality of recorded passages in closely adjacent laterally spaced tracks on a single record medium, comprising: a generally cylindrical drum rotatable about a longitudinal central axis thereof for supporting a magnetic record medium therearound bearing a plurality of axially spaced recorded passages extending arcuately about the drum axis, each of said recorded passages having a similar arcuate break therein with all of said arcuate breaks being longitudinally aligned in a recorded-passage-selection zone; means for rotating said drum to move said tracks in the direction of their length past a pickup head; a magnetic pickup head; means supporting the pickup head for indexing movement along said selection zone to operative positions corresponding respectively to said large number of passages; indexing means for moving said head supporting means to any of said positions including a control member movable proportionately with the pickup head during indexing and having a stop engaging part thereon; selector means controlling said indexing means and operable for preselecting any of said passages for reproduction including a plurality of stop members corresponding respectively to said operative positions of the head, each stop member movable to an operative position engageable with said stop engaging part to stop the control member with the head positioned for engagement with one track, a plurality of manually actuatable selectors corresponding respectively to said stop members, and means whereby each selector is operable to position one stop member and energize said indexing means to position said head in the operative position corresponding to an actuated selector; means synchronizing energization of said head indexing means and said medium advancing means to advance the medium past the head after the head is indexed to a preselected operative position; a kicker movable with the control member during indexing and movable relative thereto while the control member is stopped to disable the adjacent actuated stop member, and means responsive to movement of the medium past the head for actuating said kicker to disable the stop member and enable movement of the control member after reproduction of a selected passage.

14. Apparatus for reproducing any preselectable passage of a plurality of recorded passages in closely adjacent laterally spaced tracks on a single record medium, comprising: a generally cylindrical drum rotatable about a longitudinal central axis thereof for supporting a magnetic record medium therearound bearing a plurality of axially spaced recorded passages extending arcuately about the drum axis, each of said recorded passages having a similar arcuate break therein with all of said arcuate breaks being longitudinally aligned in a recorded-passage-selection zone; means for rotating said drum to move said tracks in the direction of their length past a pickup head; a magnetic pickup head; means supporting the pickup head for indexing movement laterally across the width of said medium to operative positions corresponding respectively to said large number of passages; indexing means for moving said head supporting means to any of said positions including a control member movable proportionately with the pickup head during indexing and having a stop engageable part thereon; selector means controlling said indexing means and operable for preselecting any of said passages for reproduction including a plurality of stop members corresponding respectively to said operative positions of the head, each stop member movable to an operative position engageable with said stop engaging part to stop the control member with the head positioned for engagement with one track, a plurality of manually actuatable selectors corresponding respectively to said stop members, and means whereby each selector is operable to position one stop member and energize said indexing means to position said head in the operative position corresponding to an actuated selector including a solenoid for positioning each stop member and a holding circuit for each solenoid including an openable switch; means synchronizing energization of said head indexing means and said drum rotating means to advance the medium one revolution past the head after the head is indexed to a preselected operative position to enable complete reproduction of a selected passage; a kicker movable with the control member during indexing and slidable relative thereto while the control member is stopped to open the switch of the adjacent actuated stop member to disable the stop member, and means responsive to movement of the medium past the head for actuating the kicker to disable the stop member and enable movement of the control member after one revolution of the drum and consequent reproduction of a selected passage.

15. Apparatus for reproducing any preselectable passage of a plurality of recorded passages in closely adjacent laterally spaced tracks on a single record medium, comprising: means for supporting said medium; means for advancing said medium to move said tracks in the direction of their length past a playback head; a playback head; means supporting the playback head for indexing movement laterally across the width of said medium to operative positions corresponding respectively to said large number of passages; indexing means for moving said head supporting means to any of said positions including a control member movable proportionately with the playback head during indexing and having a stop engaging part thereon; selector means controlling said indexing means and operable for preselecting any of said passages for reproduction including a plurality of stop members corresponding respectively to said operative positions of the head, each stop member movable to an operative position engageable with said stop engaging part to stop the control member with the head positioned for engagement with one track, a plurality of manually actuatable selectors corresponding respectively to said stop members, and means whereby each selector is operable to position one stop member and energize said indexing means to position said head in the operative position corresponding to an actuated selector; means synchronizing energization of said head indexing means and said medium advancing means to advance the medium past the head after the head is indexed to a preselected operative position; a kicker movable with the control member during indexing and movable relative thereto while the control member is stopped to disable the adjacent actuated stop member, and means responsive to movement of the medium past the head for actuating said kicker to disable the stop member and enable movement of the control member after reproduction of a selected passage.

16. Apparatus for reproducing any preselectable passage of a plurality of recorded passages in closely adjacent laterally spaced tracks on a single record medium, comprising: means for supporting said medium; means for advancing said medium to move said tracks in the direction of their length past a playback head; a playback head; means supporting the playback head for indexing movement laterally across the width of said medium to operative positions corresponding respectively to said large number of passages; indexing means for moving said head supporting means to any of said positions including a control member movable proportionately with the playback head during indexing and having a stop engaging part thereon; selector means controlling said indexing means and means whereby the selector means is operable for preselecting any of said passages for reproduction including a plurality of stop members corresponding respectively to said operative positions of the head, each stop member movable to an operative position engageable with said stop engaging part to stop the control member with the head positioned for engagement with one track, a kicker movable with the control member during indexing and movable relative thereto while the control member is stopped to move the adjacent actuated stop member to inoperative position, and means responsive to movement of the medium past the head for actuating said kicker to disable the stop member and enable movement of the control member after reproduction of a selector passage.

17. In an apparatus for reproducing selected passages from a record medium bearing a plurality of recorded passages, a playback head indexing means, comprising, a control member movable along a predetermined path and having a stop engaging part thereon, a plurality of stop members arranged alongside the path of the control member, each movable between an operative position in the path of said stop engaging part and an inoperative position outside said path, a kicker member movable with the control member along said path and slidable relative to the control member while the latter is held by an actuated stop member to engage and push the actuated stop member to an inoperative position; a stationarily mounted actuator, and a driving connection between the actuator and the kicker member for moving the latter.

18. In an indexing mechanism, a control member movable along a predetermined path and having a stop engaging part thereon, an upright guide member positioned laterally at one side of said path, a plurality of stop members each slidable in said guide member between an operative position in the path of said stop engaging part and an inoperative position outside said path, a kicker member movable with the control member along said path and slidable relative thereto while the latter is held by an actuated stop member to engage and move the stop member to inoperative position, a bell crank having one arm connected to slide the kicker member relative to the control member on pivotal movement of the bell crank, and a reciprocating motor connected to the other bell crank arm for pivoting the crank.

19. In an indexing mechanism, a rotatable crank arm having a stop engaging part thereon movable along a predetermined path on rotation of the crank arm, a plurality of stop members arranged alongside the path of the stop engaging part each movable between an operative position in the path of said stop engaging part and an inoperative position outside said path, a kicker member movable with the crank arm on rotation thereof and slidable longitudinally thereon while the crank arm is held by an actuated stop member, to engage and push the activated stop member to inoperative position; a bell crank pivoted on the crank arm and having one arm connected to slide the kicker member on the crank arm, and a stationarily mounted solenoid connected to the other bell crank arm for pivoting the bell crank.

20. In an indexing mechanism, a rotatable crank arm having a stop engaging part thereon movable along a predetermined path on rotation of the crank arm, a plurality of stop members arranged alongside the path of the stop engaging part each movable between an operative position in the path of said stop engaging part and an inoperative position outside said path, a kicker member movable with the crank arm on rotation thereof and slidable longitudinally thereon while the crank arm is held by an actuating stop member to engage and push the actuated stop member to inoperative position; a bell crank pivoted on the crank arm and having one arm connected to slide the kicker member on the crank arm, and the other arm aligned with the axis of rotation of said rotatable crank arm, a pin slidable along said axis of rotation and having one end engageable with said other bell crank arm to pivot the bell crank, and a solenoid engageable with the other end of the pin to slide the latter axially.

References Cited in the file of this patent

UNITED STATES PATENTS

| | | |
|---|---|---|
| 1,210,138 | Benedict | Dec. 26, 1916 |
| 2,235,301 | Robinson | Mar. 18, 1951 |
| 2,572,609 | Gierwiatowski | Oct. 23, 1951 |
| 2,645,494 | Keller | July 14, 1953 |
| 2,650,830 | Potter | Sept. 1, 1953 |
| 2,709,597 | Stroobants | May 31, 1955 |
| 2,714,010 | Gruber et al. | July 26, 1955 |
| 2,730,369 | Steed | Jan. 10, 1956 |